Nov. 27, 1934.  A. W. SCARRATT ET AL  1,982,456

SPRING SUSPENSION FOR MOTOR TRUCKS

Filed July 11, 1932     2 Sheets-Sheet 1

Inventors
Albert W. Scarratt
and Harry K. Reinoehl
By M. F. Doolittle
Atty.

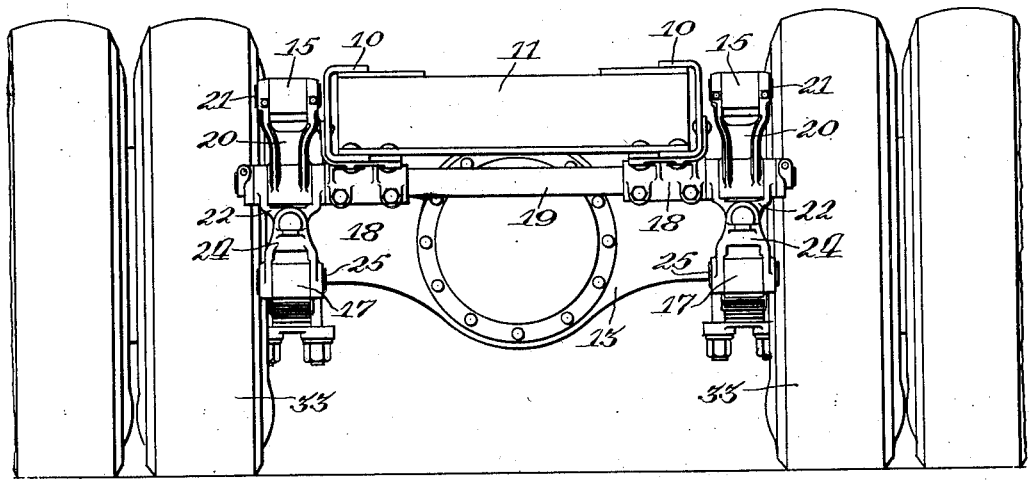
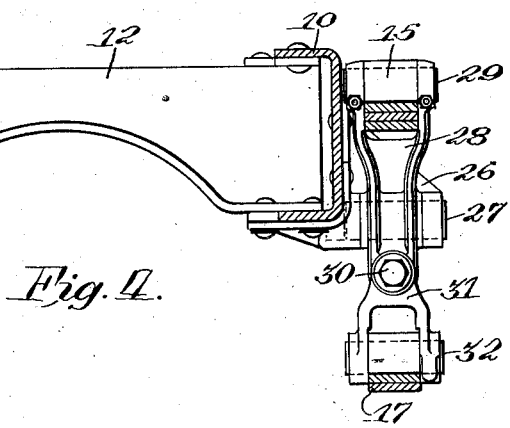
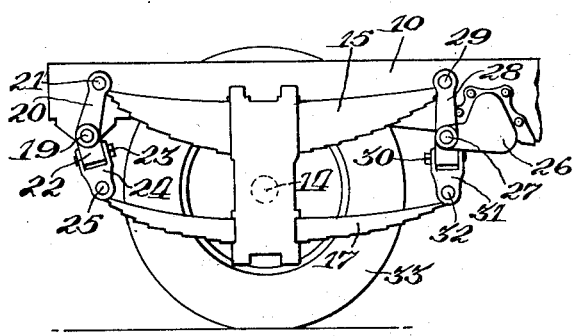

Patented Nov. 27, 1934

1,982,456

UNITED STATES PATENT OFFICE 1,982,456

SPRING SUSPENSION FOR MOTOR TRUCKS

Albert W. Scarratt, Kenilworth, Ill., and Harry K. Reinoehl, Fort Wayne, Ind., assignors to International Harvester Company, a corporation of New Jersey Application July 11, 1932, Serial No. 621,836

16 Claims. (Cl. 267—38)

This invention relates to an improved form of rear spring suspension for motor trucks of the heavy duty type employing dual semi-elliptic spring mountings.

In such arrangement the rear axle housing of the truck is subjected to severe driving torque, which force is transmitted through an upper and a lower spring through shackles to a driving pin carried in a stout bracket secured to the truck frame in advance of the front ends of the springs. Thus, all torque and driving stresses from the rear axle are centered on this pin, there being one on each side of the vehicle, which transmits the forces through the bracket to push the chassis in a manner well understood in this art.

With such construction it is found that these forces in operation of the truck are unevenly applied to these driving pins and, as a result, objectionable strains are set up, causing the lower spring, especially, to twist at its ends to such an extent that the spring suspension does not properly function.

Accordingly, the main object of this invention is to provide an improved dual rear spring suspension for heavy duty motor trucks that will overcome and correct these difficulties by causing the torque to be equalized and evenly applied to the chassis driving pins, and by preventing twisting of the springs in a lateral direction.

Other important objects will become apparent to those skilled in this art as the disclosure is more fully made.

These desirable objects are achieved, as will hereinafter be described in detail, in an upper and lower, dual, rear spring mounting by connecting the pair of semi-elliptic springs centrally to the rear axle; by connecting the rear ends thereof to the chassis and to each other by a toggle link; by connecting their front ends to the chassis driving pin and to each other by an equalizer beam rigid in a fore and aft direction; and, by a hinge in the toggle link and the equalizer beam to permit lateral hinging movement of the lower spring.

In the accompanying sheets of drawings illustrating a practicable embodiment of the invention:

Figure 3 is a general rear elevational view of the truck chassis, showing both sides;

Figure 4 is a transverse sectional view taken along the line 4—4 appearing in Figure 2, when viewed in the direction of the arrows; and, Figure 5 is a diagrammatic side elevational view similar to the showing of Figure 2, but showing the springs not under load.

Figure 1:
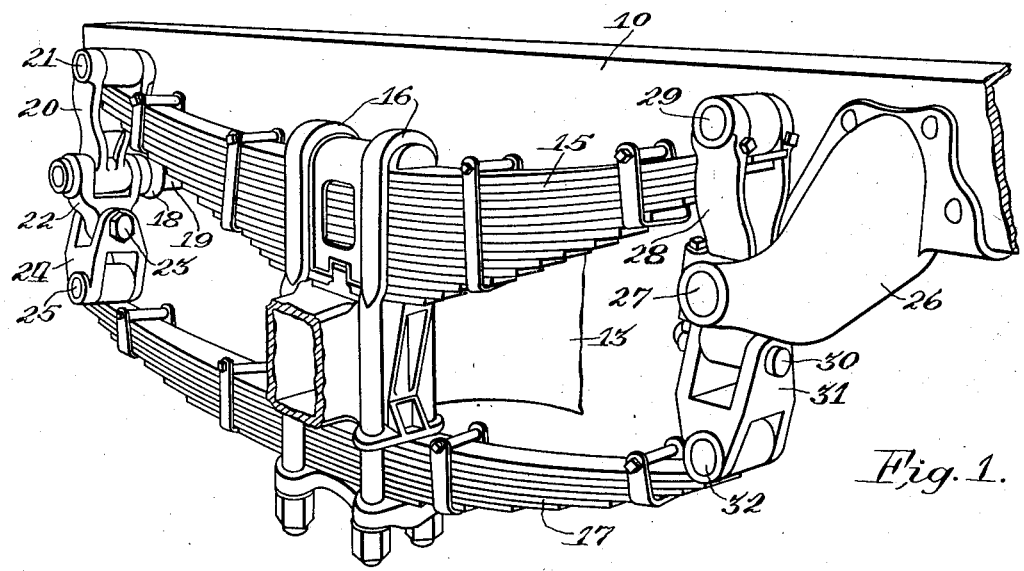
Figure 1 is a general perspective view of one side of a motor truck chassis, showing the improved dual rear spring suspension.
Figure 2:
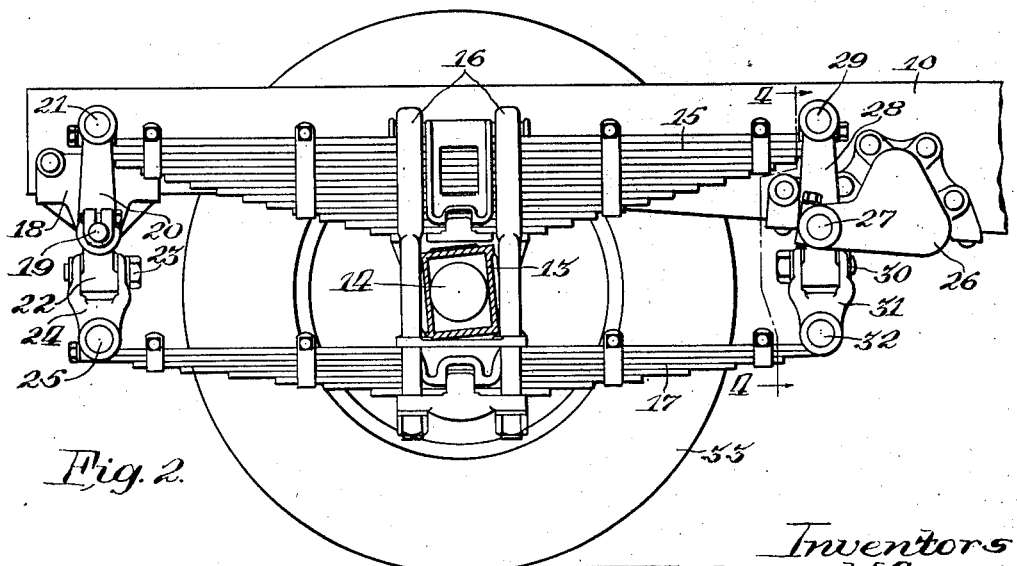
Figure 2 is a general side elevation of the structure shown in Figure 1, the springs appearing under load.

The truck frame shown is in all respects conventional and embodies the usual, two, longitudinally extending channel-shaped side frame members 10, connected at their rear ends by a cross-member 11, and in advance thereof by another cross-member 12. This frame is carried on a rear axle housing 13 through the medium of a spring mounting comprising dual semi-elliptical springs connected to the vehicle frame and to each end of the axle housing 13 in the manner now to be described. The housing 13 encloses the usual rear axle 14.

In describing the spring mountings, it will be understood that both sides are the same. The upper semi-elliptic spring is shown at 15, the same resting at a central point, midway between its ends, on the end of the axle housing 13, and anchored securely in place by a U-bolt clamp device 16. The lower spring 17 is clamped by the same device 16 to the lower side of the housing 13, directly below the upper spring 15, both springs 15, 17 being of the same length and arranged longitudinally, as shown, the lower spring being relatively lighter than the upper spring in the form herein illustrated.

The rearmost cross-frame member 11 carries a number of depending brackets 18 for rigidly mounting a transverse cross-shaft 19, the ends of which are extended laterally to lie between the rear ends of both springs 15 and 17, as best shown in Figure 3. Pivotally connected to each end of this shaft 19 is an upright bifurcated link 20 carrying at its upper end a pin 21, to which is connected the top leaf of the upper spring 15, said top leaf being curled around the pin 21 in the usual way. The ends of said shaft 19 also carry a pivoted depending link 22 of relatively short length, the lower end of said link 22 carrying a short, longitudinally disposed hinge pin 23, to which, in turn, is connected another short, depending, pivoted link 24 that carries a transverse pin 25, to which the rear end of the lower spring 17 is connected by curling the end of the top leaf therearound in the manner above described. In a fore and aft swinging direction, the lower link parts 22, 24 in effect form a single link, and such single link with the upper link 20 form a toggle link which has its break point at the shaft 19. Thus, it can be said that the rear ends of the two springs 15, 17 are connected to the frame through the cross-shaft 19, and to each other by a toggle link. The connection of the front ends of the two springs 15, 17 to the frame will next be described.

Each side frame 10 carries at its outer side in advance of the springs a sturdy bracket 26, riveted to the frame, and curved outwardly and rearwardly to receive and rigidly carry a transversely disposed driving pin 27, disposed substantially midway between the front ends of springs 15 and 17. This pin 27 pivotally carries an upright, bifurcated link or shackle 28, in turn carrying at its upper end a transverse shackle pin 29, to which the front end of the top leaf of the upper spring 15 is attached by curling the same therearound. It will be observed that the pivot of the link 28 is intermediate its ends, so that the lower end thereof extends below the drive pin 27, which lower, extended end carries a longitudinally disposed pin 30, to which is hingedly connected a relatively short link 31, in turn carrying at its lower end a transversely disposed pin 32, to which the top leaf of the lower spring 17 is shackled by curling the end thereof around said pin 32. Thus, the links 28, 31 in the fore and aft direction of movement swing together as a rigid, equalizer beam, evenly to transmit all driving torque from the rear axle housing through the springs to the driving pin 27, which takes all of the torque to move the vehicle.

The opposite ends of the rear axle 14 are connected in the usual way to be supported by wheels 33, which in this instance are of the heavy duty, dual type.

In summarizing, it will now be clear that both the upper and lower springs 15, 17 are attached at their forward ends to the upper and lower ends, respectively, of the swiveled equalizer beam 28, 31, said beam being pivoted on the driving pin 27, which is anchored in the front spring bracket 26. The equalizer beam is rigid in itself in a fore and aft direction and equalizes all torque and driving stresses through the springs when power is applied to the axle 14, and centers such forces on the driving pin 27 to propel the chassis. The longitudinal hinge pin 30 in the equalizer beam is arranged at a right angle to and directly below the driving pin 27 and allows for flexibility of the lower spring, by permitting it to move without cramp in a lateral direction, said pin 30 thus preventing the spring from twisting in a lateral direction. At their rear ends, the springs are permitted all necessary freedom of movement through the toggle linkage 20, 22, 24 to permit the beam 28, 31 to perform its equalizing function. Likewise, the hinge 23 in the lower link of this toggle allows lateral movement for the rear end of the lower spring and thus prevents lateral twisting of said rear end of the spring.

This improved dual, rear spring suspension assures greater strength to absorb the enormous torque and driving stresses of the rear axle, provides improved cushioning for chassis and load, and, in addition, makes it possible for the truck operator to use dual tires of large, heavy duty type and stay within legal requirements respecting overall width at the road. This latter feature results from the general compactness of design permitted by the novel spring suspension features of this invention.

From this disclosure it is now clear that an improved structure of the type described has been provided, which achieves the object of the invention heretofore recited, and that such structure is simple, fool proof, and practicable.

It is the intention herein to cover all such changes and modifications of the example shown for purposes of the present disclosure as do not in material respects depart from the spirit and scope of the invention as defined in the appended claims.

What is claimed is:

1. The combination with a vehicle having a frame and an axle housing, of a spring suspension therefor, comprising a pair of longitudinally disposed semi-elliptic springs secured one above and one below the axle housing, means connecting the rear ends of the springs to the frame, a bracket carried by the frame, a transversely disposed driving pin carried by the bracket, an equalizer beam between and connected to the front ends of the two springs and pivoted on said pin for movement as a rigid element in a fore and aft direction, and a hinged portion included in said beam to allow lateral movement of the lower spring.

2. The combination with a vehicle having a frame and an axle housing, of a spring suspension therefor, comprising a pair of longitudinally disposed semi-elliptic springs secured one above and one below the axle housing, means connecting the rear ends of the springs to the frame, a bracket carried by the frame, a transversely disposed driving pin carried by the bracket, an equalizer beam between and connected to the front ends of the two springs and pivoted on said pin for movement as a rigid element in a fore and aft direction, and a hinge pin in the beam arranged at a right angle to and immediately below the driving pin to allow lateral movement of the lower spring.

3. The combination with a vehicle having a frame and an axle housing, of a spring suspension therefor, comprising a pair of longitudinally disposed semi-elliptic springs secured one above and one below the axle housing, there being a set of such springs at each side of the frame, a toggle link connecting the rear ends of the two springs in each set, a shaft connecting the toggle links, said shaft being carried by the frame, an equalizer beam connecting the front ends of the springs in each set, said beam pivoted for movement in a fore and aft direction as a rigid element, and means whereby the proximate ends of the springs may have relative lateral movement with respect to each other.

4. The combination with a vehicle having a frame and an axle housing, of a spring suspension therefor, comprising a pair of longitudinally disposed semi-elliptic springs secured one above and one below the axle housing, a toggle link connecting the rear ends of the two springs and for connecting them to the frame, a hinge in the toggle to allow lateral movement of the rear end of the lower spring, an equalizer beam connecting the front ends of the springs, said beam pivoted for movement in a fore and aft direction as a rigid element, and a hinge in the equalizer beam to allow lateral movement of the front end of the lower spring.

5. The combination with a vehicle having a frame and an axle housing, of a spring suspension therefor, comprising a pair of longitudinally disposed semi-elliptic springs secured one above and one below the axle housing, there being a set of such springs at each side of the frame, a toggle link connecting the rear ends of the two springs, a cross-shaft carried by the frame on the ends of which the toggle links are carried, a driving pin mounted on the frame and located between the front ends of the springs, an equalizer beam pivotally connected to the pin for movement as a rigid element in a fore and aft direction, the forward ends of the springs being respectively connected to the ends of the equalizer beam, and hinge means whereby the proximate ends of the upper and lower springs may have relative lateral movement with respect to each other.

6. The combination with a vehicle having a frame and an axle housing, of a spring suspension therefor, comprising a pair of longitudinally disposed semi-elliptic springs secured one above and one below the axle housing, a toggle link connecting the rear ends of the two springs and for connecting them to the frame, a hinge in the toggle to allow lateral movement of the rear end of the lower spring, a driving pin mounted on the frame and located between the front ends of the springs, an equalizer beam pivotally connected to the pin for movement as a rigid element in a fore and aft direction, the front ends of the springs being respectively connected to the ends of the equalizer beam, and a hinge in the equalizer beam to allow lateral movement of the front end of the lower spring.

7. The combination with a vehicle having a frame and an axle housing, of a spring suspension therefor, comprising a pair of longitudinally disposed semi-elliptic springs secured one above and one below the axle housing, a toggle link connecting the rear ends of the two springs and for connecting them to the frame, a hinge in the toggle to allow lateral movement of the rear end of the lower spring, a driving pin mounted on the frame and located between the front ends of the springs, an equalizer beam pivotally connected to the pin for movement as a rigid element in a fore and aft direction, the front ends of the springs being respectively connected to the ends of the equalizer beam, and a hinge pin disposed in the equalizer beam at a right angle to the driving pin and immediately there-below to permit lateral movement of the front end of the lower spring.

8. The combination with a vehicle having a frame and an axle housing, of a spring suspension therefor, comprising a pair of longitudinally disposed semi-elliptic springs secured one above and one below the axle housing, a cross-shaft on the frame having an end located between the rear ends of the two springs, a transverse driving pin carried by the frame and located between the front ends of the two springs, a pair of shackle links forming a toggle link pivotally mounted on the shaft, the rear ends of the springs being respectively connected to the free ends of said shackle links, an equalizer beam pivoted intermediate of its ends on the driving pin for rigid fore and aft movement, the front ends of the springs respectively being connected to the ends of said equalizer beam, and hinges in the toggle link and equalizer beam to allow the lower spring to have lateral movement.

9. The combination with a vehicle having a frame and an axle housing, of a spring suspension therefor, comprising a pair of longitudinally disposed semi-elliptic springs secured one above and one below the axle housing, a cross-shaft on the frame having an end located between the rear ends of the two springs, a transverse driving pin carried by the frame and located between the front ends of the two springs, a pair of shackle links forming a toggle link pivotally mounted on the shaft, the rear ends of the springs being respectively connected to the free ends of said shackle links, an equalizer beam pivoted intermediate of its ends on the driving pin for rigid fore and aft movement, the front ends of the springs respectively being connected to the ends of said equalizer beam, and hinge pins arranged in the toggle and the beam respectively disposed at a right angle to the cross-shaft and the driving pin to permit a portion of the toggle and beam to swing laterally to prevent twist in the lower spring.

10. The combination with a vehicle having a pair of spaced, longitudinal side frames, a cross-frame member at the rear thereof, a rear axle housing, of a spring suspension for the frame on the housing comprising a pair of semi-elliptic springs connected one above and one below each end of the housing, a cross-shaft carried by the rear cross-frame member, the ends of the shaft extending between the rear ends of the springs, a driving pin extending laterally from each side frame and located between the front ends of the springs, shackles pivotally connecting the rear ends of the springs to the cross-shaft, and equalizer beams pivotally connecting the front ends of the springs to the drive pins, said beams being rigid for movement in a fore and aft direction, and hinges in the shackles and beams to allow for lateral swinging movement of the lower springs.

11. In a vehicle, a chassis including an axle housing, a spring suspension for the chassis comprising a pair of springs secured one above and one below the housing, there being a set of such springs at each side of the frame, a shaft between the rear ends of the springs, a driving pin on the chassis between the front ends of the springs, means for independently and pivotally shackling the rear ends of the springs to the shaft, said shaft providing a common support for said rear end shackling means, an equalizer device pivoted to the driving pin for dependently shackling the front ends of the springs, and means whereby proximate ends of the springs in each set may have relative lateral movement.

12. In a vehicle, a chassis including an axle housing, a spring suspension for the chassis comprising a pair of springs secured one above and one below the housing, a shaft between the rear ends of the springs, a driving pin on the chassis between the front ends of the springs, means for independently and pivotally shackling the rear ends of the springs to the shaft, an equalizer beam pivoted to the driving pin intermediately of its ends for dependently shackling the front ends of the springs, and means to allow the lower spring to have lateral swinging movement.

13. In a vehicle, a chassis including an axle housing, a spring suspension for the chassis comprising a pair of springs secured one above and one below the housing, a shaft between the rear ends of the springs, a driving pin on the chassis between the front ends of the springs, means for independently and pivotally shackling the rear ends of the springs to the shaft, an equalizer beam pivoted to the driving pin intermediately of its ends for dependently shackling the front ends of the springs, and means comprising hinges in the front and rear shackle elements immediately below the shaft and pin to allow the lower spring to have lateral swinging movement.

14. In a vehicle, a frame, an axle housing, a spring suspension for the frame comprising a pair of longitudinally disposed springs secured one above and one below the axle housing, proximate ends of said springs being connected with the frame in load supporting relation thereto and for fore and aft relative movement, and means whereby said ends of the springs may have relative lateral movement with respect to each other.

15. In a vehicle, a frame, an axle housing, a spring suspension for the frame comprising a pair of longitudinally disposed springs secured one above and one below the axle housing, proximate ends of said springs being connected with the frame in load supporting relation thereto and for fore and aft relative movement, and hinge means for the ends of the lower spring whereby it may swing laterally with respect to the proximate ends of the upper spring.

16. In a vehicle, a frame, an axle housing, a spring suspension for the frame comprising a pair of longitudinally disposed superimposed semi-elliptic springs secured one above and one below the axle housing, the proximate rear ends of the springs being connected with the frame in load supporting relation thereto and for fore and aft relative movement, a driving pin carried by the frame, the proximate front ends of said springs being connected with said driving pin, and means whereby the proximate front ends and the proximate rear ends of said springs may have relative lateral swinging movement.

ALBERT W. SCARRATT.
HARRY K. REINOEHL.